(12) United States Patent
    Bae et al.

(10) Patent No.: US 10,367,219 B2
(45) Date of Patent: Jul. 30, 2019

(54) POLYMER ELECTROLYTE MEMBRANE, MEMBRANE ELECTRODE ASSEMBLY COMPRISING SAME, AND FUEL CELL COMPRISING MEMBRANE ELECTRODE ASSEMBLY

(71) Applicant: LG CHEM, LTD., Seoul (KR)

(72) Inventors: Insung Bae, Daejeon (KR); Moonchan Lee, Daejeon (KR); Hyuk Kim, Daejeon (KR); Minkyu Min, Daejeon (KR); Ji Hun Kim, Daejeon (KR); Curie Park, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 15/574,735

(22) PCT Filed: Jul. 6, 2016

(86) PCT No.: PCT/KR2016/007309
    § 371 (c)(1),
    (2) Date: Nov. 16, 2017

(87) PCT Pub. No.: WO2017/090860
    PCT Pub. Date: Jun. 1, 2017

(65) Prior Publication Data
    US 2018/0145358 A1    May 24, 2018

(30) Foreign Application Priority Data

Nov. 26, 2015  (KR) .................. 10-2015-0166726
    Jun. 20, 2016  (KR) .................. 10-2016-0076753

(51) Int. Cl.
    *H01M 8/02*      (2016.01)
    *H01M 8/1004*    (2016.01)
    (Continued)

(52) U.S. Cl.
    CPC ....... *H01M 8/1004* (2013.01); *H01M 4/8605* (2013.01); *H01M 8/1051* (2013.01);
    (Continued)

(58) Field of Classification Search
    CPC ............. H01M 8/1004; H01M 4/8605; H01M 8/1051; H01M 8/1053; H01M 2008/1095; H01M 8/1069; H01M 4/926; Y02P 70/56
    See application file for complete search history.

(56) References Cited

U.S. PATENT DOCUMENTS 8,652,705 B2    2/2014  Berta et al.
2004/0241520 A1 12/2004  Ha et al.
                        (Continued)

FOREIGN PATENT DOCUMENTS

EP    0 875 524 A2    11/1998
JP    7-135004 A      5/1995
                (Continued)

OTHER PUBLICATIONS

International Search Report issued in PCT/KR2016/007309 (PCT/ISA/210), dated Oct. 12, 2016.
(Continued)

*Primary Examiner* — Cynthia K Walls
(74) *Attorney, Agent, or Firm* — Birch, Stewart, Kolasch & Birch, LLP (57) ABSTRACT

The present specification relates to a polymer electrolyte membrane, a membrane electrode assembly including the same, and a fuel cell including the membrane electrode assembly.

14 Claims, 8 Drawing Sheets

(51) Int. Cl.
    *H01M 4/86* (2006.01)
    *H01M 8/1051* (2016.01)
    *H01M 8/1053* (2016.01)
    *H01M 4/92* (2006.01)
    *H01M 8/1069* (2016.01)
    *H01M 8/1018* (2016.01)

(52) U.S. Cl.
    CPC .......... *H01M 8/1053* (2013.01); *H01M 4/926* (2013.01); *H01M 8/1069* (2013.01); *H01M 2008/1095* (2013.01); *Y02P 70/56* (2015.11)

(56) References Cited

U.S. PATENT DOCUMENTS

| | | | |
|---|---|---|---|
| 2005/0260476 A1 | 11/2005 | Xie | |
| 2006/0166069 A1 | 7/2006 | Min et al. | |
| 2006/0188775 A1* | 8/2006 | Mance | H01M 4/8652 429/482 |
| 2007/0072036 A1* | 3/2007 | Berta | H01M 4/8807 429/432 |
| 2007/0269698 A1 | 11/2007 | Gu | |
| 2013/0022895 A1 | 1/2013 | Jiang et al. | |
| 2015/0236367 A1 | 8/2015 | Kim et al. | |

FOREIGN PATENT DOCUMENTS

| | | |
|---|---|---|
| JP | 11-176456 A | 7/1999 |
| JP | 2003-157862 A | 5/2003 |
| JP | 2005-332672 A | 12/2005 |
| JP | 2006-210349 A | 8/2006 |
| JP | 2007-12299 A | 1/2007 |
| KR | 10-2003-0045324 A | 6/2003 |
| KR | 10-2004-0103198 A | 12/2004 |
| KR | 10-2006-0086117 A | 7/2006 |
| KR | 10-2015-0097024 A | 8/2015 |
| KR | 10-2015-0126717 A | 11/2015 |

OTHER PUBLICATIONS

Search Report for European Patent Application No. 16868761.4, dated Apr. 10, 2019.

* cited by examiner

POLYMER ELECTROLYTE MEMBRANE, MEMBRANE ELECTRODE ASSEMBLY COMPRISING SAME, AND FUEL CELL COMPRISING MEMBRANE ELECTRODE ASSEMBLY

TECHNICAL FIELD

This application claims priority to and the benefits of Korean Patent Application No. 10-2015-0166726, filed with the Korean Intellectual Property Office on Nov. 26, 2015 and Korean Patent Application No. 10-2016-0076753, filed with the Korean Intellectual Property Office on Jun. 20, 2016, the entire contents of which are incorporated herein by reference.

The present specification relates to a polymer electrolyte membrane, a membrane electrode assembly including the same, and a fuel cell including the membrane electrode assembly.

BACKGROUND ART

With recent predictions about the exhaustion of existing energy resources such as petroleum and coal, interests in alternative energy capable of replacing these have been growing. As one of such alternative energy, fuel cells have received attention with advantages of being highly efficient, not emitting pollutants such as NOx and SOx, and having sufficient fuel to use.

Fuel cells are a power generating system converting chemical reaction energy of fuel and oxidizer to electric energy, and hydrogen, methanol and hydrocarbon such as butane are used as the fuel, and oxygen is typically used as the oxidizer.

Fuel cells include polymer electrolyte membrane-type fuel cells (PEMFC), direct methanol-type fuel cells (DMFC), phosphoric acid-type fuel cells (PAFC), alkaline-type fuel cells (AFC), molten carbonate-type fuel cells (MCFC), solid oxide-type fuel cells (SOFC) and the like.

DISCLOSURE

Technical Problem

The present specification is directed to providing a polymer electrolyte membrane, a membrane electrode assembly including the same, and a fuel cell including the membrane electrode assembly.

Technical Solution

One embodiment of the present specification provides a polymer electrolyte membrane including a first polymer layer including first ceramic particles, and a second polymer layer provided on the first polymer layer and including second ceramic particles, wherein the first ceramic particles and the second ceramic particles have different surface properties.

Another embodiment of the present specification provides a membrane electrode assembly including an anode; a cathode; and the polymer electrolyte membrane provided between the anode and the cathode.

Still another embodiment of the present specification provides a fuel cell including the membrane electrode assembly.

Advantageous Effects

In a fuel cell according to one embodiment of the present specification, water is readily managed under a low humidity condition.

In a fuel cell according to one embodiment of the present specification, battery performance is favorable under a low humidity condition.

MODE FOR DISCLOSURE

Hereinafter, the present specification will be described in detail.

The present specification provides a polymer electrolyte membrane including a first polymer layer including first ceramic particles, and a second polymer layer provided on the first polymer layer and including second ceramic particles.

The first polymer layer may include first ceramic particles, and more specifically, the first polymer layer may include first ceramic particles and a first ion conductive polymer.

The first polymer layer may have a thickness of greater than or equal to 500 nm and less than or equal to 30 μm.

The second polymer layer may include second ceramic particles, and more specifically, the second polymer layer may include second ceramic particles and a second ion conductive polymer.

The second polymer layer may have a thickness of greater than or equal to 500 nm and less than or equal to 30 μm.

The polymer electrolyte membrane may further include a third polymer layer provided between the first polymer layer and the second polymer layer, and including a porous support and an electrolyte polymer provided inside pores of the porous support.

The electrolyte polymer may be the same as or different from the first ion conductive polymer of the first polymer layer and the second ion conductive polymer of the second polymer layer. The electrolyte polymer may include at least one polymer of the first ion conductive polymer of the first polymer layer and the second ion conductive polymer of the second polymer layer.

When the first ion conductive polymer of the first polymer layer and the second ion conductive polymer of the second polymer layer are different from each other, the electrolyte polymer may include both the first ion conductive polymer of the first polymer layer and the second ion conductive polymer of the second polymer layer.

When the first ion conductive polymer of the first polymer layer and the second ion conductive polymer of the second polymer layer are the same as each other, the electrolyte polymer may be the same as the first ion conductive polymer of the first polymer layer and the second ion conductive polymer of the second polymer layer.

The third polymer layer may have a thickness of greater than or equal to 500 nm and less than or equal to 30 µm.

The first polymer layer and the second polymer layer may be layers prepared by forming a membrane with a casting method using a polymer electrolyte composition without a porous support.

When further including the third polymer layer, the third polymer layer may be, separately from the first polymer layer and the second polymer layer, a layer formed by impregnating a polymer electrolyte composition into a porous support.

When further including the third polymer layer, one surface of the porous support is impregnated with a polymer electrolyte composition forming the first polymer layer, and the other surface of the porous support, that is, a surface opposite to the surface impregnated with a polymer electrolyte composition forming the first polymer layer, may be impregnated with a polymer electrolyte composition forming the second polymer layer.

When further including the third polymer layer, by impregnating one surface of the porous support with a polymer electrolyte composition forming the first polymer layer, some of the pores of the porous support is provided with the polymer electrolyte composition forming the first polymer layer, and the first polymer layer may be formed with the polymer electrolyte composition forming the first polymer layer on one surface of the porous support. In addition, by impregnating the other surface of the porous support, that is, a surface opposite to the surface impregnated with the polymer electrolyte composition forming the first polymer layer, with a polymer electrolyte composition forming the second polymer layer, some of the pores of the porous support is provided with the polymer electrolyte composition forming the second polymer layer, and the second polymer layer may be formed with the polymer electrolyte composition forming the second polymer layer on the other surface of the porous support.

Depending on the types of the ion conductive polymers of the first and the second polymer layers or the type of the electrolyte polymer of the third polymer layer, the first to the third polymer layers may each be a hydrocarbon-based polymer electrolyte membrane, a partial fluorine-based polymer electrolyte membrane or a fluorine-based polymer electrolyte membrane.

In one embodiment of the present specification, the polymer electrolyte compositions forming the first to the third polymer layers may each include a solvent and an ion conductive polymer.

The ion conductive polymer means a polymer having ion conductivity, and specifically, may be a polymer having cation conductivity capable of transferring hydrogen cations. The ion conductive polymer may be a hydrocarbon-based polymer, a partial fluorine-based polymer or a fluorine-based polymer, and common materials known in the art may be used.

The ion conductive polymers of the first and the second polymer layers or the electrolyte polymer of the third polymer layer may be the same as or different from each other, and may each independently include one or more types selected from among Nafion, sulfonated polyetheretherketone, sulfonated polyketone, sulfonated poly(phenylene oxide), sulfonated poly(phenylene sulfide), sulfonated polysulfone, sulfonated polycarbonate, sulfonated polystyrene, sulfonated polyimide, sulfonated polyquinoxaline, sulfonated (phosphonated) polyphosphazene and sulfonated polybenzimidazole.

The content of the ion conductive polymer may be controlled depending on a proper ion exchange capacity (IEC) value required for an electrolyte membrane for a fuel cell to use. In the ion conductive polymer synthesis for preparing an electrolyte membrane for a fuel cell, the ion conductive polymer may be designed by calculating a value of ion exchange capacity (IEC, meq./g=mmol/g). Although it varies depending on the needs, the polymer content may be selected within a range of $0.5 \leq IEC \leq 3$.

The weight average molecular weight of the ion conductive polymer may be from tens of thousands to millions. Specifically, the weight average molecular weight of the ion conductive polymer may be selected between greater than or equal to ten thousand and less than or equal to one million.

The solvent for the polymer electrolyte membrane is not particularly limited as long as it is a material capable of reacting with a polymer and dissolving the polymer, and common materials known in the art may be used.

The first ceramic particles and the second ceramic particles may have different surface properties from each other.

The first ceramic particles may be hydrophilic ceramic particles or hydrophobic ceramic particles. Preferably, the first ceramic particles may be hydrophilic ceramic particles.

The second ceramic particles may be hydrophilic ceramic particles or hydrophobic ceramic particles. Preferably, the second ceramic particles may be hydrophobic ceramic particles.

The content of the first ceramic particles of the first polymer layer and the content of the second ceramic particles of the second polymer layer may be different.

The first ceramic particles and the second ceramic particles are ceramic particles that are the same as or different from each other, and the content of the first ceramic particles of the first polymer layer and the content of the second ceramic particles of the second polymer layer may be different.

The first ceramic particles and the second ceramic particles may be the same ceramic particles, and the content of the first ceramic particles of the first polymer layer and the content of the second ceramic particles of the second polymer layer may be different.

In the present specification, ceramic refers to a material formed only with non-metallic elements in the periodic table of the elements (for example, oxygen, nitrogen, boron, carbon, silicon and the like), or formed with non-metallic elements and metallic elements. The ceramic may be divided into oxide ceramic in which oxygen among non-metallic elements and one or more metallic elements form ionic bonds or covalent bonds, and non-oxide ceramic in which nitrogen, boron, carbon, silicon and the like other than oxygen among non-metallic elements and one or more metallic elements form ionic bonds or covalent bonds.

The first and the second ceramic particles may each include oxide ceramic or non-oxide ceramic, and for example, the first and the second ceramic particles may each include at least one of silica, alumina ($Al_2O_3$), zeolite, zirconia, silicon nitride and silicon carbide.

The first ceramic particles and the second ceramic particles may be first silica and second silica, respectively.

The first silica may be hydrophilic silica or hydrophobic silica. Preferably, the first silica may be hydrophilic silica.

The second silica may be hydrophilic silica or hydrophobic silica. Preferably, the second silica may be hydrophobic silica.

Silica particles are basically hydrophilic particles having a hydroxyl group (—OH) on the surface, and therefore, the hydrophilic silica may be silica particles that are not surface treated, hydrophilic silica prepared by additionally carrying out surface treatment such as plasma treatment increasing a hydroxyl group content on the silica particle surface, or hydrophilic silica treated with a hydrophilic functional group or a hydrophilic material other than a hydroxyl group on the silica particle surface.

Meanwhile, the hydrophobic silica may be silica providing hydrophobicity on the silica surface by reacting a hydrophobic material with a hydroxyl group of the silica, and for example, may be silica of which surface is modified to be hydrophobic using methylsilane on the silica surface.

The content of the first silica of the first polymer layer and the content of the second silica of the second polymer layer may be different.

The first silica and the second silica may be silica that is the same as or different from each other, and the content of the first silica of the first polymer layer and the content of the second silica of the second polymer layer may be different.

The first silica and the second silica may be the same silica, and the content of the first silica of the first polymer layer and the content of the second silica of the second polymer layer may be different.

When the first silica and the second silica are both hydrophilic silica, the content of the first silica of the first polymer layer may be higher than the content of the second silica of the second polymer layer.

When the first silica and the second silica are both hydrophobic silica, the content of the first silica of the first polymer layer may be lower than the content of the second silica of the second polymer layer.

Based on the total weight of the first polymer layer, the content of the first ceramic particles may be greater than or equal to 1 wt % and less than or equal to 20 wt %.

Based on the total weight of the second polymer layer, the content of the second ceramic particles may be greater than or equal to 1 wt % and less than or equal to 20 wt %.

When the content of the first silica of the first polymer layer and the content of the second silica of the second polymer layer are different, a difference in the content of the first silica of the first polymer layer and the content of the second silica of the second polymer layer may be greater than or equal to 1 wt % and less than or equal to 10 wt %.

The present specification provides a membrane electrode assembly including an anode; a cathode; and the polymer electrolyte membrane provided between the anode and the cathode.

For the membrane electrode assembly, descriptions on the polymer electrolyte membrane provided above may be used.

The first polymer layer is provided on the anode, the second polymer layer is provided on the cathode, the first ceramic particles may be hydrophilic ceramic particles, and the second ceramic particles may be hydrophobic ceramic particles. This causes back diffusion of water from the second polymer layer to the first polymer layer adjoining the anode that is relatively readily dried leading to an advantage of effective low humidity water management.

The first polymer layer, the third polymer layer, the second polymer layer and the cathode are consecutively provided on the anode, the first ceramic particles may be hydrophilic ceramic particles, and the second ceramic particles may be hydrophobic ceramic particles. This causes back diffusion of water from the second polymer layer to the first polymer layer adjoining the anode that is relatively readily dried leading to an advantage of effective low humidity water management, and the third polymer layer having strong mechanical strength prevents expansion and contraction of the polymer layers depending on humidified and low humidity circumstances, and blocks a reaction gas crossover leading to an advantage of enhancing durability.

The first polymer layer, the third polymer layer, the second polymer layer and the cathode are consecutively provided on the anode, the first ceramic particles and the second ceramic particles are the same ceramic particles, and the content of the first ceramic particles of the first polymer layer and the content of the second ceramic particles of the second polymer layer may be different. This may cause back diffusion of water obtained from a concentration gradient of the ceramic particles of the two polymer layers leading to effective water management under a low humidity condition.

The first ceramic particles and the second ceramic particles may be first silica and second silica, respectively.

The first polymer layer is provided on the anode, the second polymer layer is provided on the cathode, the first ceramic particles may be hydrophilic silica, and the second ceramic particles may be hydrophobic silica.

The first polymer layer, the third polymer layer, the second polymer layer and the cathode are consecutively provided on the anode, the first silica may be hydrophilic silica, and the second silica may be hydrophobic silica. This causes back diffusion of water from the second polymer layer to the first polymer layer adjoining the anode that is relatively readily dried leading to an advantage of effective low humidity water management, and the third polymer layer having strong mechanical strength prevents expansion and contraction of the polymer layers depending on humidified and low humidity circumstances, and blocks a reaction gas crossover leading to an advantage of enhancing durability.

The first polymer layer, the third polymer layer, the second polymer layer and the cathode are consecutively provided on the anode, the first silica and the second silica are the same silica, and the content of the first silica of the first polymer layer and the content of the second silica of the second polymer layer may be different.

When the first silica and the second silica are both hydrophilic silica, the content of the first silica of the first polymer layer may be higher than the second silica of the second polymer layer. On the contrary, when the first silica and the second silica are both hydrophobic silica, the content of the first silica of the first polymer layer may be lower than the second silica of the second polymer layer. This may cause back diffusion of water obtained from a concentration gradient of the silica particles of the two polymer layers leading to effective water management under a low humidity condition.

Figure 1:
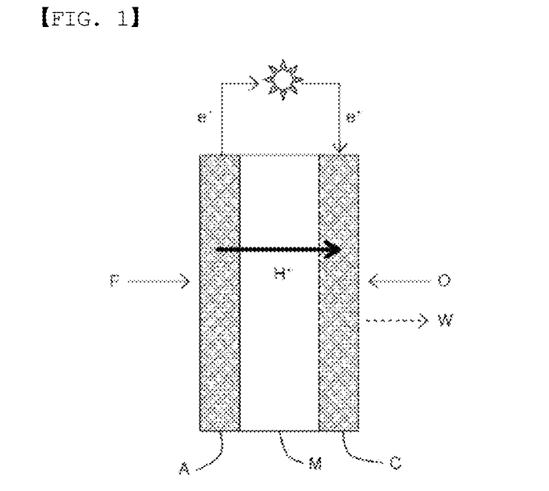
FIG. 1 is a schematic diagram showing a principle of electricity generation of a fuel cell.

FIG. 1 is a diagram schematically showing a principle of electricity generation of a fuel cell, and in a fuel cell, a most basic unit generating electricity is a membrane electrode assembly (MEA), which is formed with an electrolyte membrane (M), and an anode (A) and a cathode (C) formed on both surfaces of this electrolyte membrane (M). When referring to FIG. 1 showing a principle of electricity generation of a fuel cell, an oxidation reaction of fuel (F) such as hydrogen, methanol or hydrocarbon such as butane occurs in an anode (A) to generate hydrogen ions ($H^+$) and electrons ($e^-$), and the hydrogen ions migrate to a cathode (C) through an electrolyte membrane (M). In the cathode (C), the hydrogen ions transferred through the electrolyte membrane (M), an oxidizer (O) such as oxygen, and electrons react to produce water (W). Through such a reaction, electrons migrate to an external circuit.

Figure 2:
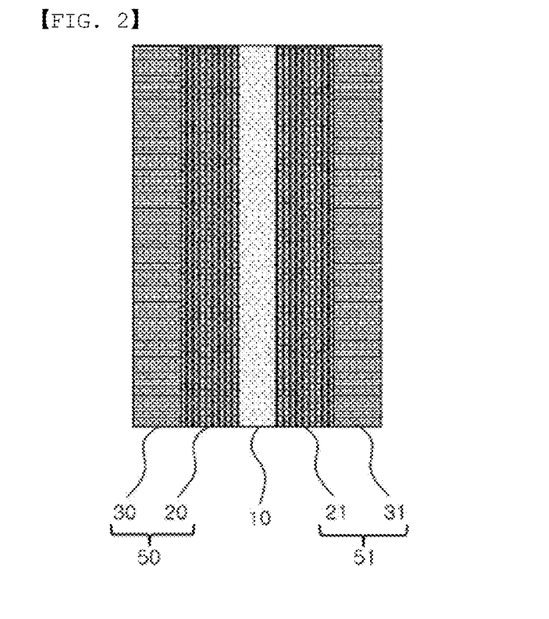
FIG. 2 is a diagram schematically illustrating a structure of a membrane electrode assembly.

As illustrated in FIG. 2, the membrane electrode assembly may be provided with an electrolyte membrane (10), and a cathode (50) and an anode (51) placed opposite to each other with this electrolyte membrane (10) in between. Specifically, the cathode may include a cathode catalyst layer (20) and a cathode gas diffusion layer (30) consecutively provided from the electrolyte membrane (10), and the anode may include an anode catalyst layer (21) and an anode gas diffusion layer (31) consecutively provided from the electrolyte membrane (10).

The anode and the cathode may include an anode catalyst layer and a cathode catalyst layer, respectively.

The anode catalyst layer and the cathode catalyst layer may each include a catalyst and an ionomer.

Each catalyst ink forming the anode catalyst layer and the cathode catalyst layer may independently include a catalyst, an ionomer and a solvent.

The catalyst is not particularly limited in the type as long as it is capable of performing a role of a catalyst in a fuel cell, and may include one of platinum, a transition metal and an alloy of platinum-transition metal.

Herein, the transition metal is an element of groups 3 to 11 in the periodic table, and examples thereof may include any one of ruthenium, osmium, palladium, molybdenum and rhodium.

Specifically, the catalyst may be selected from the group consisting of platinum, ruthenium, osmium, platinum-ruthenium alloys, platinum-osmium alloys, platinum-palladium alloys, platinum-molybdenum alloys and platinum-rhodium alloys, but is not limited thereto.

The catalysts may be used as they are, or may be used while being supported on a carbon-based carrier.

Preferred examples of the carbon-based carrier may include any one selected from the group consisting of graphite, carbon black, acetylene black, denka black, ketjen black, active carbon, porous carbon, carbon nanotubes, carbon nanofibers, carbon nanohorns, carbon nanorings, carbon nanowires, fullerene (C60) and Super P black, or mixtures of two or more types thereof.

The ionomer performs a role of providing a passage for ions generated from the reaction between fuel such as hydrogen or methanol and a catalyst to migrate to the electrolyte membrane. As the ionomer, Nafion ionomers or sulfonated polymers such as sulfonated polytrifluorostyrene may be specifically used.

As the solvent included in the catalyst ink, any one selected from the group consisting of water, butanol, iso-propanol, methanol, ethanol, n-propanol, n-butyl acetate and ethylene glycol, or a mixture of two or more types thereof may be preferably used.

The process of introducing the catalyst layer may be carried out using common methods known in the art, and for example, the catalyst layer may be formed by directly coating the catalyst ink on the electrolyte membrane, or by forming the catalyst layer on a release substrate, thermocompression bonding the result to the electrolyte membrane and then removing the release substrate, or by coating on the gas diffusion layer. Herein, the coating method of the catalyst ink is not particularly limited, and methods of spray coating, tape casting, screen printing, blade coating, inkjet coating, die coating, spin coating or the like may be used.

The anode gas diffusion layer and the cathode gas diffusion layer are each provided on one surface of the catalyst layer, and become a migration path of reaction gases and water while performing a role of a current conductor, and have a porous structure. Accordingly, the gas diffusion layer may be formed including a conductive substrate.

As the conductive substrate, common materials known in the art may be used, and preferred examples thereof may include carbon paper, carbon cloth or carbon felt. However, the conductive substrate is not limited thereto.

The gas diffusion layer may have a thickness of greater than or equal to 200 μm and less than or equal to 500 μm. This has an advantage in that an optimal condition is obtained in terms of minimizing reactant gas transfer resistance through the gas diffusion layer and containing optimum moisture inside the gas diffusion layer.

The present specification provides a fuel cell including the membrane electrode assembly. Specifically, the fuel cell may include two or more of the membrane electrode assemblies.

The fuel cell is a fuel cell including a stack including two of more of the membrane electrode assemblies according to the present specification and a separator provided between the membrane electrode assemblies; a fuel supply unit supplying fuel to the stack; and an oxidizer supply unit supplying an oxidizer to the stack.

Figure 3:
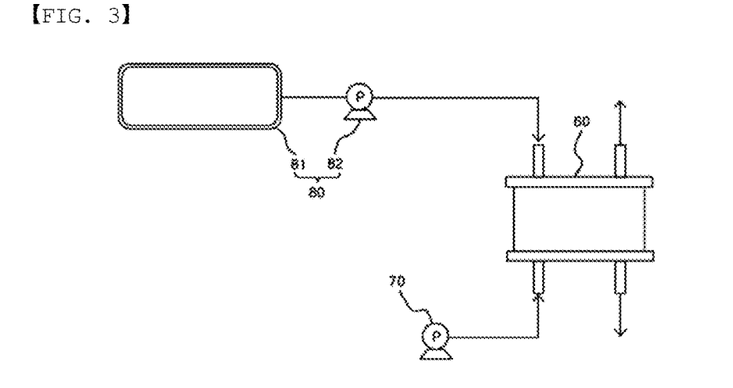
FIG. 3 is a diagram schematically illustrating one example of a fuel cell.
Figure 4:
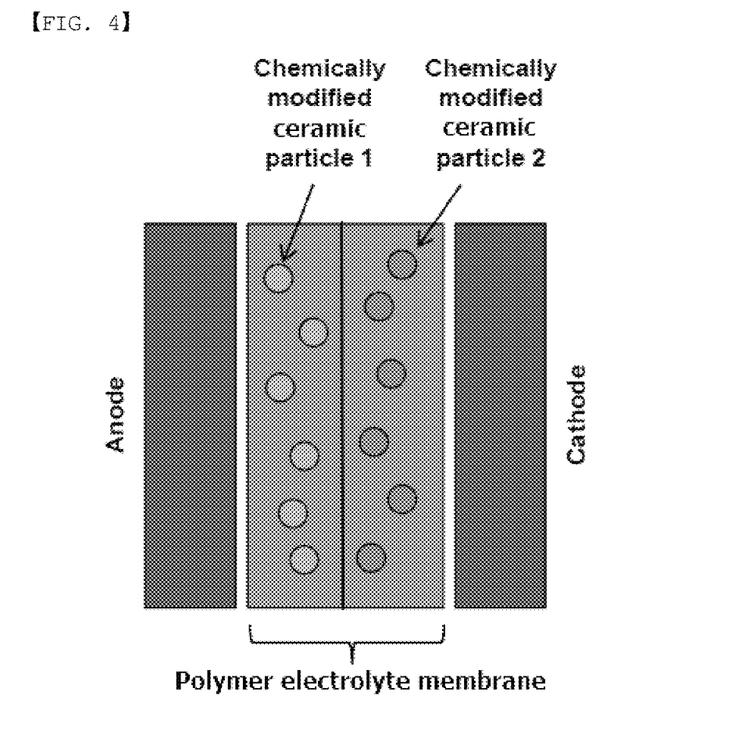
FIG. 4 is a diagram illustrating a structure of a membrane electrode assembly according to a first embodiment of the present specification.
Figure 5:
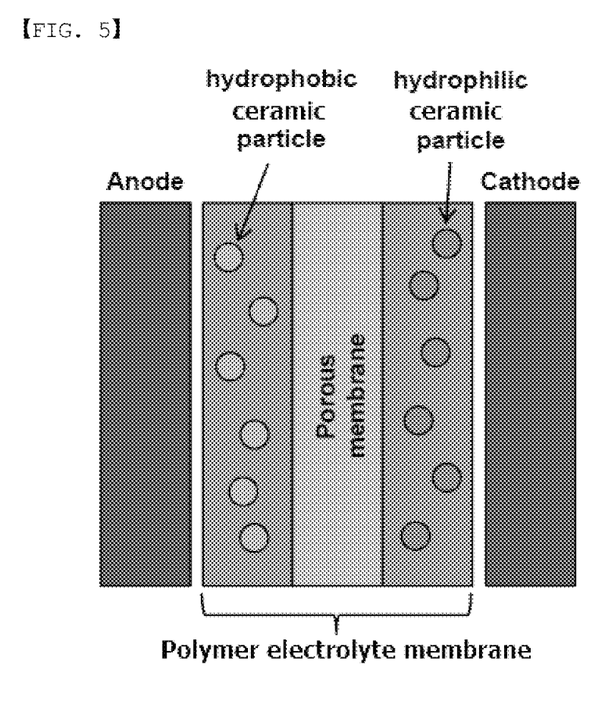
FIG. 5 is a diagram illustrating a structure of a membrane electrode assembly according to a second embodiment of the present specification.
Figure 6:
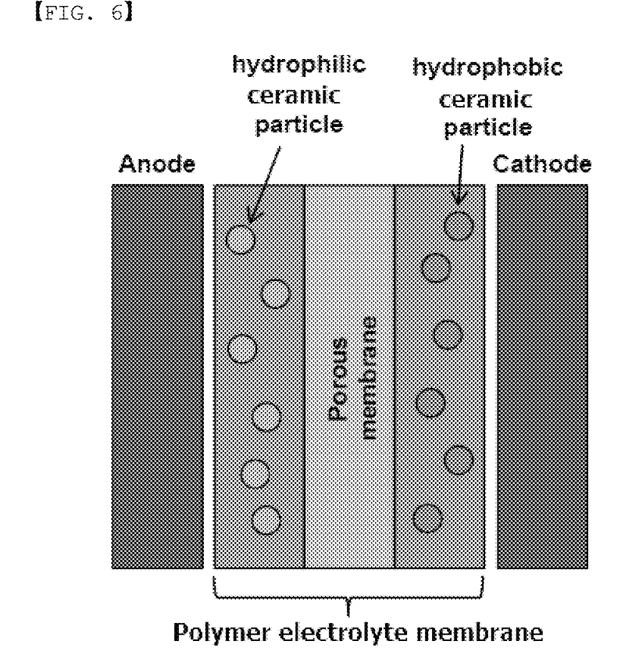
FIG. 6 is a diagram illustrating a structure of a membrane electrode assembly according to a third embodiment of the present specification.
Figure 7:
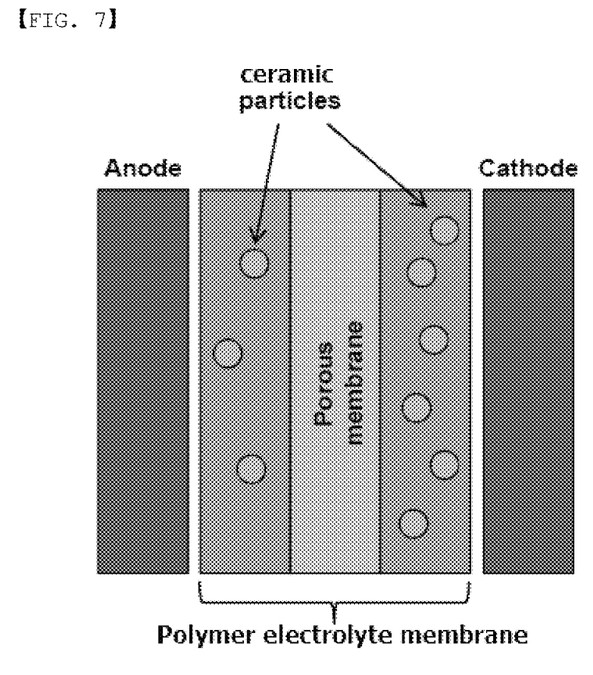
FIG. 7 is a diagram illustrating a structure of a membrane electrode assembly according to a fourth embodiment of the present specification.
Figure 8:
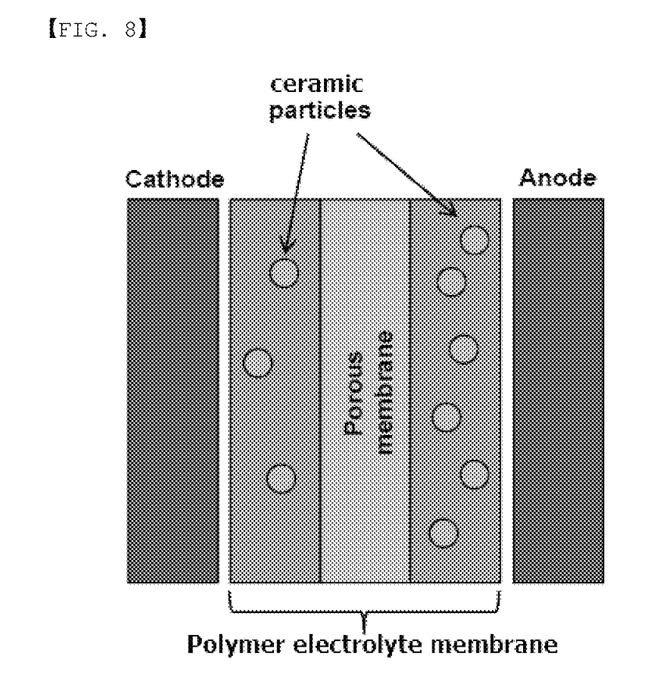
FIG. 8 is a diagram illustrating a structure of a membrane electrode assembly according to a fifth embodiment of the present specification.

FIG. 3 schematically illustrates a structure of the fuel cell, and the fuel cell is formed including a stack (60), an oxidizer supply unit (70) and a fuel supply unit (80).

The stack (60) includes one, two or more of the membrane-electrode assemblies described above, and when two or more of the membrane-electrode assemblies are included, a separator provided therebetween is included. The separator prevents the membrane-electrode assemblies from being electrically connected, and performs a role of transferring fuel and oxidizer supplied from the outside to the membrane-electrode assemblies.

The oxidizer supply unit (70) performs a role of supplying an oxidizer to the stack (60). As the oxidizer, oxygen is typically used, and oxygen or air may be injected with a pump (82).

The fuel supplying unit (80) performs a role supplying fuel to the stack (60), and may be formed with a fuel tank (81) storing fuel, and a pump (82) supplying the fuel stored in the fuel tank (81) to the stack (60). As the fuel, hydrogen or hydrocarbon fuel in a gas or liquid state may be used. Examples of the hydrocarbon fuel may include methanol, ethanol, propanol, butanol or natural gas.

Hereinafter, the present specification will be described in detail with reference to examples. However, the following examples are for illustrative purposes only, and are not to limit the present specification.

EXAMPLE

Example 1

1) Preparation of Hydrocarbon-Based Polymer

Hydroquinonesulfonic acid potassium salt (0.9 eq.), 4,4'-difluorobenzophenone (0.97 eq.) and 3,5-bis(4-fluorobenzoyl)phenyl(4-fluorophenyl)methanone (0.02 eq.) were introduced to a 1 L round bottom flask equipped with a Dean-Stark trap and a condenser, and prepared in a dimethyl sulfoxide (DMSO) and benzene solvent using potassium carbonate ($K_2CO_3$) as a catalyst under nitrogen atmosphere. Next, the reaction mixture was stirred for 4 hours in an oil bath at a temperature of 140° C., and after removing an azeotropic mixture by adsorbing the azeotropic mixture to molecular sieves of the Dean-Stark trap while benzene flowed backward, the reaction temperature was raised to 180° C., and a condensation polymerization of the result was reacted for 20 hours. After the reaction was terminated, the temperature of the reactant was lowered to 60° C., 4,4'-difluorobenzophenone (0.2275 eq.), 9,9-bis(hydroxyphenyl) fluorine (0.335 eq.) and 3,5-bis(4-fluorobenzoyl)phenyl(4-fluorophenyl)-methanone (0.005 eq.) were introduced to the same flask, and the reaction started again using $K_2CO_3$ as a catalyst and using dimethyl sulfoxide (DMSO) and benzene under nitrogen atmosphere.

Next, the reaction mixture was stirred again for 4 hours in an oil bath at a temperature of 140° C., and after removing an azeotropic mixture by adsorbing the azeotropic mixture to molecular sieves of the Dean-Stark trap while benzene flowed backward, the reaction temperature was raised to 180° C., and a condensation polymerization of the result was reacted for 20 hours. Then the temperature of the reactant was lowered to room temperature, and DMSO was further added to dilute a product, and the diluted product was poured into excess methanol to separate a copolymer from the solvent. After that, excess potassium carbonate was removed using water, and then the copolymer obtained from filtration was dried for 12 hours or longer in a vacuum oven at 80° C. to prepare a branched sulfonated multi-block copolymer in which hydrophobic blocks and hydrophilic blocks are alternatively linked through chemical bonds.

2) Preparation of Silica Particles (Fumed Silica)

Silica particles were prepared using a high temperature gas phase reaction, and produced by hydrolyzing chlorosilane in flames of 1000° C. or higher formed with oxygen and hydrogen. Basic particles made in the flames were linked to each other through collision to form secondary particles while the surface was still melted, and as a result, aggregates or agglomerates linked in a three-dimensional branched form were prepared. After the reaction, hydrogen chloride gas remaining in the silica was removed under a high temperature air condition. Density of the fumed silica was very low immediately after preparation, and the density was raised to 50 g/L or greater using a method of deflation using a pressure reducing device.

3) Preparation of Silica-Added Composite Membrane

The hydrocarbon-based polymer synthesized in 1) and hydrophilic silica particles were added to a dimethyl sulfoxide (DMSO) solvent with the silica particle content ratio being 5 wt % with respect to the hydrocarbon-based polymer, and then the result was filtered to prepare a hydrophilic silica polymer composition.

The hydrocarbon-based polymer synthesized in 1) and hydrophobic silica particles were added to a dimethyl sulfoxide (DMSO) solvent with the silica particle content ratio being 5 wt % with respect to the hydrocarbon-based polymer, and then the result was filtered to prepare a hydrophobic silica polymer composition.

Herein, as the prepared silica particles, hydrophilic silica particles of which surfaces were treated with a hydroxyl group (—OH) and hydrophobic silica particles of which surfaces were treated with a methyl group (—$CH_3$) were used.

On both surfaces of a three-dimensional network structured support having a thickness of approximately 6 μm and porosity of approximately 75%, the hydrophilic silica polymer composition and the hydrophobic silica polymer solution were impregnated and coated on the surface adjoining an anode and the surface adjoining a cathode, respectively. The result was dried for 24 hours in an oven at 80° C. to prepare a silica-added hydrocarbon-based composite membrane. The prepared polymer electrolyte membrane was acid treated for 24 hours at 80° C. using 10% sulfuric acid, washed 4 or more times with distilled water, and then dried at 80° C. to prepare a polymer electrolyte membrane.

Example 2

A hydrocarbon-based electrolyte membrane was prepared in the same manner as in Example 1 except that the hydrophilic silica polymer composition was coated/impregnated on the surface adjoining a cathode and the hydrophobic silica polymer composition was coated/impregnated on the surface adjoining an anode.

Comparative Example 1

A hydrocarbon-based electrolyte membrane was prepared in the same manner as in Example 1 except that the hydrophilic silica polymer composition was coated/impregnated on both surfaces of the support.

Comparative Example 2

A hydrocarbon-based electrolyte membrane was prepared in the same manner as in Example 1 except that the hydrophobic silica polymer composition was coated/impregnated on both surfaces of the support.

Comparative Example 3

A hydrocarbon-based electrolyte membrane was prepared in the same manner as in Example 1 except that a polymer simply mixing hydrophilic silica and hydrophobic silica was coated/impregnated inside the support without a location gradient.

Experimental Example 1

In order to measure performance of the polymer electrolyte membranes prepared in the examples and the comparative examples in a fuel cell, a membrane electrode assembly including the polymer electrolyte membrane was prepared. Specifically, the polymer electrolyte membrane was cut into a quadrangle of 8 cm×8 cm, and at the top and the bottom of the polymer electrolyte membrane, a carbon-supported platinum catalyst with 0.4 mg/$cm^2$ of platinum was transferred to a size of 5 cm×5 cm to prepare a membrane electrode assembly.

Performance evaluation on the membrane electrode assembly prepared above was carried out under a H₂/air and atmospheric pressure condition and a 50% relative humidity (RH) condition.

Figure 9:
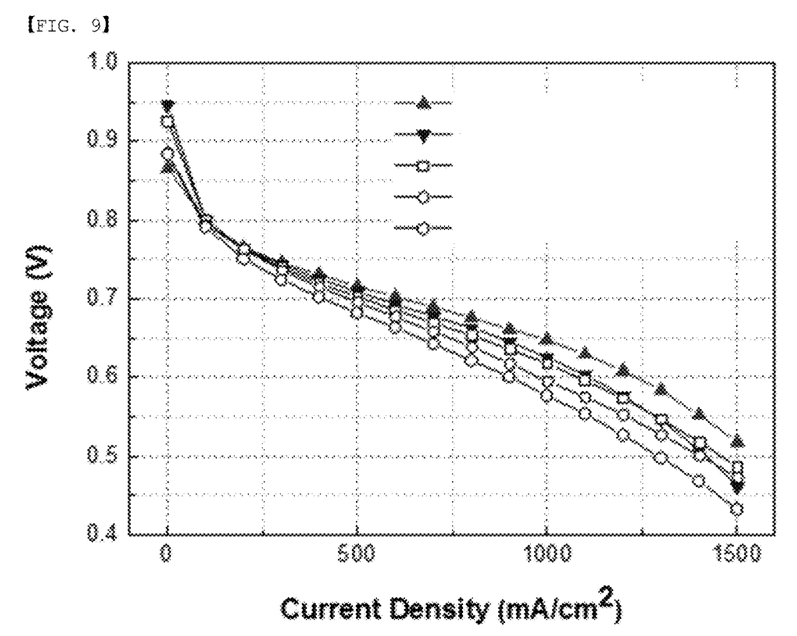
FIG. 9 shows a current density-dependent voltage of polymer electrolyte membranes according to examples and comparative examples under a 50% relative humidity (RH) condition in a fuel cell.

FIG. 9 shows a current density-dependent voltage of the polymer electrolyte membranes according to the examples and the comparative examples under a 50% relative humidity (RH) condition in a fuel cell.

Figure 10:
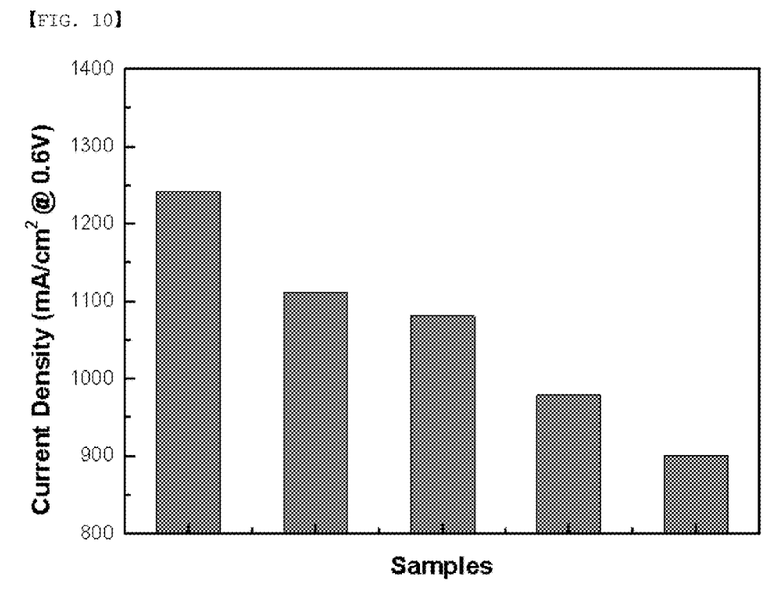
FIG. 10 shows a current density value of polymer electrolyte membranes according to examples and comparative examples at 0.6 V under a 50% relative humidity (RH) condition in a fuel cell.

FIG. 10 shows a current density value of the polymer electrolyte membranes according to the examples and the comparative examples at 0.6 V under a 50% relative humidity (RH) condition in a fuel cell.

As indicated from the results of FIG. 9 and FIG. 10, the polymer electrolyte membranes according to the examples are capable of accomplishing stable performance under a high humidity condition, and more stable and more superior performance are capable of being maintained when hydrophobic silica particles are placed on a cathode side and hydrophilic silica particles are placed on an anode side as in the polymer electrolyte membrane according to Example 1.

The invention claimed is:

1. A polymer electrolyte membrane comprising:
    a first polymer layer including first ceramic particles; and
    a second polymer layer provided on the first polymer layer and including second ceramic particles,
    wherein the first ceramic particles and the second ceramic particles have different surface properties.

2. The polymer electrolyte membrane of claim 1, wherein the first ceramic particles are hydrophilic ceramic particles, and the second ceramic particles are hydrophobic ceramic particles.

3. The polymer electrolyte membrane of claim 1, wherein the polymer electrolyte membrane further includes a third polymer layer provided between the first polymer layer and the second polymer layer, and including a porous support and an electrolyte polymer provided inside pores of the porous support.

4. The polymer electrolyte membrane of claim 3, wherein the first ceramic particles are hydrophilic ceramic particles, and the second ceramic particles are hydrophobic ceramic particles.

5. The polymer electrolyte membrane of claim 1, wherein the first and the second ceramic particles each include at least one of silica, alumina ($Al_2O_3$), zeolite, zirconia, silicon nitride and silicon carbide.

6. The polymer electrolyte membrane of claim 1, wherein the first ceramic particles and the second ceramic particles are first silica and second silica, respectively.

7. The polymer electrolyte membrane of claim 6, wherein the first silica is hydrophilic silica, and the second silica is hydrophobic silica.

8. A membrane electrode assembly comprising:
    an anode;
    a cathode; and
    the polymer electrolyte membrane of claim 1 provided between the anode and the cathode.

9. The membrane electrode assembly of claim 8, wherein the first polymer layer is provided on the anode, and the second polymer layer is provided on the cathode, and the first ceramic particles are hydrophilic ceramic particles, and the second ceramic particles are hydrophobic ceramic particles.

10. The membrane electrode assembly of claim 8, wherein the first polymer layer, a third polymer layer, the second polymer layer and the cathode are consecutively provided on the anode, the first ceramic particles are hydrophilic ceramic particles, and the second ceramic particles are hydrophobic ceramic particles, and
    wherein the third polymer layer includes a porous support and an electrolyte polymer provided inside pores of the porous support.

11. The membrane electrode assembly of claim 8, wherein the first and the second ceramic particles each include at least one of silica, alumina ($Al_2O_3$), zeolite, zirconia, silicon nitride and silicon carbide.

12. The membrane electrode assembly of claim 8, wherein the first ceramic particles and the second ceramic particles are first silica and second silica, respectively.

13. The membrane electrode assembly of claim 12, wherein the first silica is hydrophilic silica, and the second silica is hydrophobic silica.

14. A fuel cell comprising the membrane electrode assembly of claim 8.

* * * * *